(12) United States Patent
Rudolf et al.

(10) Patent No.: US 8,274,401 B2
(45) Date of Patent: Sep. 25, 2012

(54) SECURE DATA TRANSFER IN A COMMUNICATION SYSTEM INCLUDING PORTABLE METERS

(75) Inventors: Gerald K. Rudolf, Indianapolis, IN (US); Muhammad Sajjad Abdullah, Indianapolis, IN (US); David Brian Alder, Fishers, IN (US); Pulin Rajesh Shah, Indianapolis, IN (US); Steven William Thomas, Carmel, IN (US); Stanley Edson Brown, Indianapolis, IN (US)

(73) Assignee: Acterna LLC, Germantown, MD (US)

( * ) Notice: Subject to any disclaimer, the term of this patent is extended or adjusted under 35 U.S.C. 154(b) by 1313 days.

(21) Appl. No.: 11/961,429

(22) Filed: Dec. 20, 2007

(65) Prior Publication Data

US 2008/0150753 A1 Jun. 26, 2008

Related U.S. Application Data

(60) Provisional application No. 60/871,502, filed on Dec. 22, 2006.

(51) Int. Cl.
*G08C 15/06* (2006.01)

(52) U.S. Cl. ......... 340/870.03; 340/870.02; 340/870.07; 713/155; 713/156

(58) Field of Classification Search ............. 340/870.02, 340/870.03, 870.07; 713/155, 156
See application file for complete search history.

(56) References Cited

U.S. PATENT DOCUMENTS

| | | | |
|---|---|---|---|
| 5,729,594 A | 3/1998 | Klingman | 379/93.12 |
| 5,867,206 A * | 2/1999 | Voght et al. | 725/107 |
| 6,778,525 B1 | 8/2004 | Baum et al. | 370/351 |
| 6,798,751 B1 | 9/2004 | Voit et al. | 370/252 |
| 6,829,250 B2 | 12/2004 | Voit et al. | 370/467 |
| 6,867,707 B1 * | 3/2005 | Kelley et al. | 340/870.02 |
| 6,880,115 B2 | 4/2005 | Abraham et al. | 714/712 |
| 6,920,208 B1 | 7/2005 | Rosen et al. | 379/126 |
| 6,971,008 B2 | 11/2005 | Wasilewski et al. | 713/168 |
| 7,010,598 B2 | 3/2006 | Sitaraman et al. | 709/224 |
| 7,017,175 B2 | 3/2006 | Alao et al. | 725/105 |
| 7,069,254 B2 | 6/2006 | Foulger et al. | 706/14 |
| 7,111,318 B2 | 9/2006 | Vitale et al. | 725/107 |
| 7,136,998 B2 | 11/2006 | Yamagishi et al. | 713/157 |
| 7,139,910 B1 | 11/2006 | Ainsworth et al. | 713/155 |
| 7,170,905 B1 | 1/2007 | Baum et al. | 370/467 |
| 7,181,017 B1 * | 2/2007 | Nagel et al. | 380/282 |
| 7,305,697 B2 | 12/2007 | Alao et al. | 725/114 |
| 2003/0154376 A1 * | 8/2003 | Hwangbo | 713/173 |
| 2004/0163128 A1 | 8/2004 | Phillips et al. | 725/120 |
| 2004/0254757 A1 * | 12/2004 | Vitale et al. | 702/122 |
| 2005/0033958 A1 * | 2/2005 | Connell | 713/156 |
| 2005/0141712 A1 | 6/2005 | Koo et al. | 380/231 |
| 2006/0277289 A1 | 12/2006 | Bayliss et al. | 709/223 |
| 2007/0180229 A1 | 8/2007 | Salowey et al. | 713/156 |
| 2007/0201348 A1 | 8/2007 | Geile et al. | 370/204 |
| 2007/0214497 A1 | 9/2007 | Montgomery et al. | 726/4 |
| 2007/0226488 A1 | 9/2007 | Lin et al. | 713/156 |
| 2007/0245401 A1 * | 10/2007 | Brabson et al. | 726/1 |
| 2007/0250915 A1 | 10/2007 | Thibadeau | 726/5 |
| 2007/0255743 A1 | 11/2007 | Gaucas | 707/102 |

\* cited by examiner

*Primary Examiner* — Jared Fureman
*Assistant Examiner* — Alfonso Perez Borroto
(74) *Attorney, Agent, or Firm* — Matthew A. Pequignot; Pequignot + Myers LLC

(57) ABSTRACT

The invention relates to a method of performing measurements with a portable meter and reporting measurement data from the portable meter to a central office over a secure channel. The method includes synchronizing the portable meter and the central office though a trusted interface prior to taking measurements at a customer location.

19 Claims, 9 Drawing Sheets

SECURE DATA TRANSFER IN A COMMUNICATION SYSTEM INCLUDING PORTABLE METERS

CROSS-REFERENCE TO RELATED APPLICATIONS

The present invention claims priority from Provisional Patent Application No. 60/871,502 filed Dec. 22, 2006 entitled "CATV Industry Secure Data Transfer Process", which is incorporated herein by reference.

TECHNICAL FIELD

The present invention relates to measuring signals in communication systems, and more particularly to methods and systems for the transfer of measurements from a portable meter to a central office.

BACKGROUND OF THE INVENTION

Recent years have seen a continuing increase in the usage of the Internet for connecting testing equipment to a central office for dynamically reporting test results.

By way of example, U.S. Pat. No. 7,111,318 issued on Sep. 19, 2006 in the name of Vitale et al., incorporated herein by reference, teaches a method of performing work on a CATV communication system by a remote test device exchanging information with a central office.

Community Antenna Television ("CATV") systems are communication systems that transmit and distribute television signals to end users, or subscribers. In general, CATV systems comprise a headend facility, also referred to as a central office, and a distribution network. The headend facility obtains television signals associated with a plurality of CATV channels and generates a broadband CATV signal therefrom. The distribution network then delivers the CATV broadband signal to television receivers located within the residences and business establishments of subscribers.

The operation and maintenance of CATV networks requires a significant amount of field work, or in other words, operations performed in portions of the distribution network, away from the headend facility. Examples of field operations include installation of new cable service, installation of new network components, troubleshooting subscriber complaints, and general maintenance of the network. Many field operations are performed by technicians that travel from network location to network location performing a variety of the above described tasks.

A handheld meter is an important tool used by field network technicians to test cable modem services, digital video, analog video, and VoIP signals. The meter, when connected to a coaxial cable of a cable network, acts as a customer's modem enabling the validation of network services available to the customer. The testing may involve monitoring ongoing traffic; injection of predetermined test messages to monitor the system's response; measuring operational parameters, such as bit error rates, message travel times and the like; or monitoring the operation of individual components of the system. On the physical level, CATV meters perform various types of measurements, depending on the channel type, in a CATV system including, but not limited to: Signal strength, Signal quality, Distance to a cable break, Ingress (interference from external sources entering the cable line), and Tilt (the natural loss of signal strength as frequency increases).

In general, a centralized facility registers or defines the tasks to be performed, and then allocates the various field tasks, referred to herein as work assignments, to the various technicians. A work assignment may be a new subscriber installation, an upgrade to a subscriber installation, or a trouble ticket. A work assignment may also be an instruction to perform general measurements at select areas of the distribution network. Systems that perform allocation of work assignments to technicians are known. Each technician then performs the work assignments allocated to him or her during the course of the work day.

One issue that arises in connection with the performance of measurements in connection with work assignments relates to customer privacy, since a work assignment includes customer identification in the form of a name, a billing number, social security number, account number or the like. Another issue relates to measured data sent to the headend that affects customer billing, and therefore should be protected from tampering therewith.

Currently, the CATV industry uses File Transfer Protocol (FTP) to send data between meters in the field and a central office. The measurement and configuration data transferred via FTP is not encrypted, so it is not only easy to read, but easy to alter, as well. Furthermore, CATV service providers prefer not to enable FTP connectivity from a client location outside a firewall to central office computers behind the firewall. Thus, a server accumulating measurement data is often placed outside a firewall rendering it vulnerable to malicious attacks. Therefore, there is a need for a method of secure communication between CATV meters and the central office.

It is desirable to employ cryptography for providing confidentiality, authentication, integrity and non-repudiation for communication between CATV meters and the central office over public communication channels.

In a public-key scheme, each user has a key pair consisting of a public key that is made publicly available, and a private key that is kept secret. The two keys are related by a hard one-way function, so as to make it infeasible to determine the private key from the public key. The public-key scheme allows a signature in the form of a digital signature to accompany a message.

A digital signature is a cryptographic primitive that provides a means for a user or an entity to bind its identity to a piece of information. A digital signature of a message is a sequence of bytes dependent on some secret known only to the signer, and, additionally, on the content of the message being signed. Such signatures must be verifiable, if a dispute arises as to whether a party signed a document. The process of signing entails transforming the message and a key unique to a particular user into a tag called a digital signature. A digital signature may be used to prove the identity of the sender and the integrity of data. To verify the digital signature, a recipient of a digitally signed message can use a verification rule associated with the digital signature scheme. Any attempt to modify the contents of the message or forge a signature will be detected when the signature is verified.

An additional issue associated with the portable meters is the problem of a lost or stolen meter, which could be used to gain access to the central office. Furthermore, the Public Key Infrastructure (PKI) can be curtailed by a compromised certificate obtained from the lost or stolen portable meter. Accordingly, it is desirable to disable access of the lost meter to the central office as soon the loss is reported. The PKM provides a mechanism for certificate revocation; however, revoking a certificate requires a restart of the http server forcing any currently connected meters to lose their connection requiring them to retry at a later time. Therefore, it is desirable to enable an additional filter to prevent connection by an actual meter which had been lost or a third party using the valid certificate obtained from lost meter without the need for certificate revocation and without the requirement of restarting the server.

It is an object of the present invention to overcome the shortcomings of the prior art and provide a method of secure communication between a central office and a portable meter at a customer location. It is another object to provide a system including a portable meter and a central office in secure communication for performing measurements at a customer location. Yet another object of the instant invention is to provide a secure system for dynamic meter access management and monitoring.

SUMMARY OF THE INVENTION

Accordingly, the present invention provides a method of performing measurements with a portable meter and reporting measurement data from the portable meter to a central office having a server security certificate and a meter management table stored therein, comprising the steps of:

(a) synchronizing the portable meter at a first location with the central office over a trusted interface resulting in the portable meter having a meter copy of a meter certificate and the central office having a predefined portion of the meter certificate in the meter management table, wherein the predefined portion uniquely identifies the portable meter;

(b) performing the measurements with the portable meter at a second location and generating the measurement data;

(c) establishing a secure channel between the portable meter connected to an IP network at the customer location and the central office, including:

transmitting the server security certificate from the central office to the portable meter;

transmitting the meter copy of the meter certificate from the portable meter to the central office, thereby providing the central office with a received copy of the meter certificate;

verifying the received copy of the meter certificate at the central office;

determining if the meter management table contains the predefined portion of the received copy of the meter certificate;

transmitting the measurement data to the central office from the portable meter over the IP network though the secure channel if the received certificate is successfully verified and if the meter management table contains the predefined portion of the received copy of the meter certificate;

(d) processing the measurement data received from the portable meter at the central office.

Another aspect of the present invention relates to a portable meter for performing measurements at a first location and reporting measurement data through a secure channel over a network, comprising:

measuring means for performing the measurements at the first location and generating the measurement data, a meter memory for storing a meter security certificate and having meter instructions stored therein including:

a synchronization instruction set for synchronizing the portable meter at a second location with another end of the secure channel, resulting in the portable meter having the meter certificate and the another end having a predefined portion of the meter certificate, wherein the predefined portion uniquely identifies the portable meter; and a meter networking instruction set for sending the meter security certificate over the network to the another end and establishing the secure channel between the portable meter at the first location and the another end, and for sending the measurement data though the secure channel;

wherein the another end has secure channel means for synchronizing with the portable meter resulting in the portable meter having the meter certificate stored therein and the another end having the predefined portion of the meter certificate stored therein, for comparing the predefined portion of a received security certificate received over the network to the predefined portion of the meter certificate stored at the another end to determine if there is a match, and for closing the secure channel if no match has been determined.

Another feature of the present invention provides a measuring system comprising the portable meter and a computer readable memory device having secure channel instructions stored therein for providing the another end with the secure channel means, including:

a meter management component for providing a meter management table with a meter record containing the predefined portion of the meter security certificate;

a meter identification instruction set for extracting the predefined portion from a received security certificate, and for identifying a matching record in the meter management table, so that at least a portion of the matching record matches to the predefined portion of the received meter security certificate; and a permission refusal instructions for permitting the another end to receive data from a sender of the received security certificate only if the matching record is identified, and for closing the secure channel otherwise.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
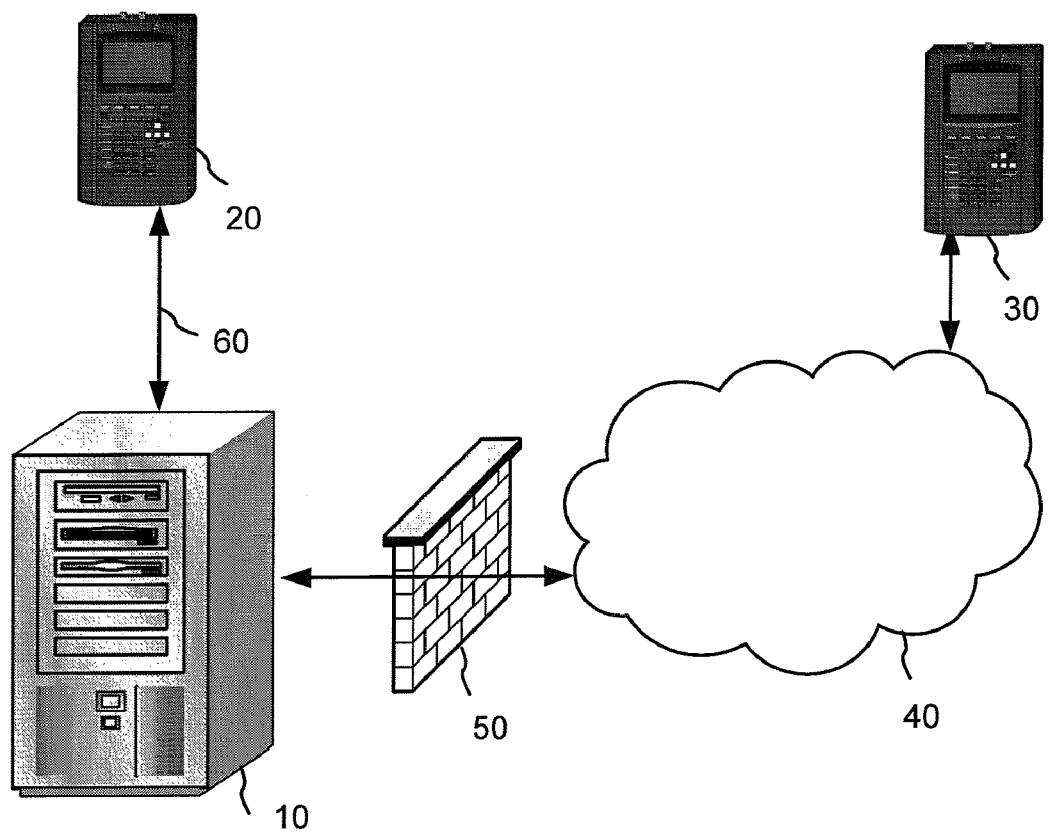
FIG. 1 is a schematic illustration of the system according to the instant invention.

Before describing in detail embodiments that are in accordance with the present invention, it should be observed that the embodiments reside primarily in combinations of method steps and apparatus components related to establishing a secure channel between a portable meter and a central office.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that a portable meter and central office described herein may be comprised of one or more conventional processors and unique stored program instructions that control the one or more processors to implement, in conjunction with certain non-processor circuits, some, most, or all of the functions for secure communication between the portable meter and the central office as described herein. The non-processor circuits may include, but are not limited to, a radio receiver, a radio transmitter, signal drivers, clock circuits, power source circuits, and user input devices. As such, these functions may be interpreted as steps of a method for secure communication.

Alternatively, some or all functions could be implemented in one or more application specific integrated circuits (ASICs), or in one or more field-programmable gate arrays (FPGA). Of course, a combination of different approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The memory of the portable meter and the central office computers may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information.

All of the embodiments described in this Detailed Description are exemplary embodiments provided to enable persons skilled in the art to make or use the invention and not to limit the scope of the invention which is defined by the claims.

In reference to FIG. 1, the instant invention provides a system comprising a plurality of portable meters, such as meters 20 and 30, for communicating with a central office 10, whereto the meters transfer measurements over an IP network 40, and a method of making this transfer secure.

The central office 10 comprises one or more processors, for example such as server-grade CPUs, and memory such as one or more hard disks. Functional components of the central office 10 will be described below as residing in one computer, referred to as a server herein; however, the central office 10 can be a distributed system as well. The central office 10 has a server security certificate 260 and a meter management table 280, shown in FIG. 4, stored in the server memory.

The meters 20 and 30 by way of example are CATV meters for measuring various parameters, e.g. signal strength; mean error ratios; signal quality; distance to a cable break; ingress, understood as interference from external sources entering the cable line; tilt, understood as the natural loss of signal strength as frequency increases, and other measurements related to analog and digital modulated signals. The meter 30 is shown in FIG. 1 as connected to the server 10 via the IP network 40 and through a firewall 50, whereas the meter 20 is shown as connected to the server 10 via a trusted interface 60, by way of example a port accessible only behind the firewall 50. For the purpose of describing the method of the instant invention, the meters 20 and 30 are understood as representing the same portable device placed at different locations at s trusted location and at a customer location, respectively.

Figure 2:
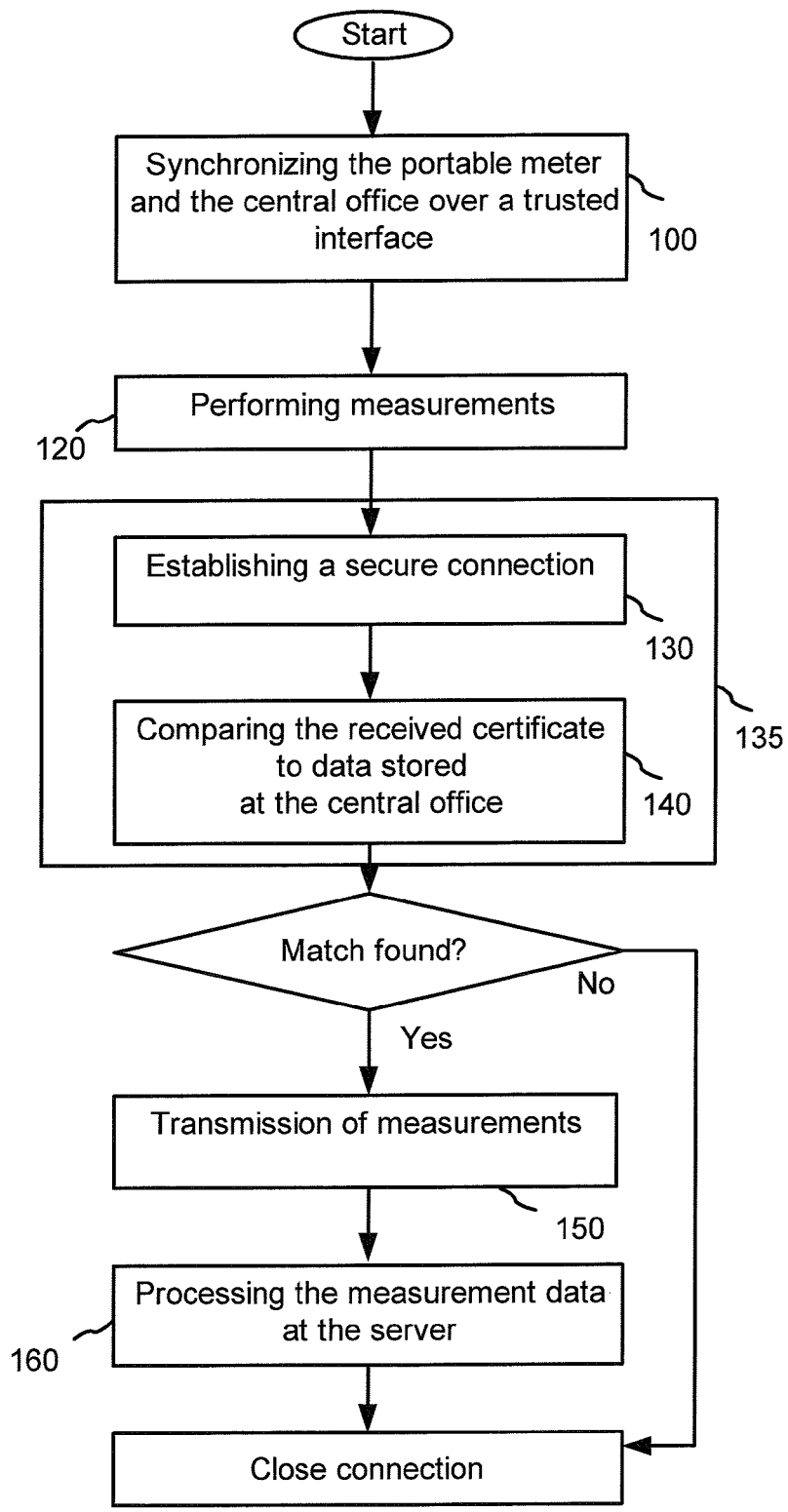
FIG. 2 illustrates a block diagram of a method of performing measurements using a portable meter and transferring the measurements over a secure channel to a central office.
Figure 4:
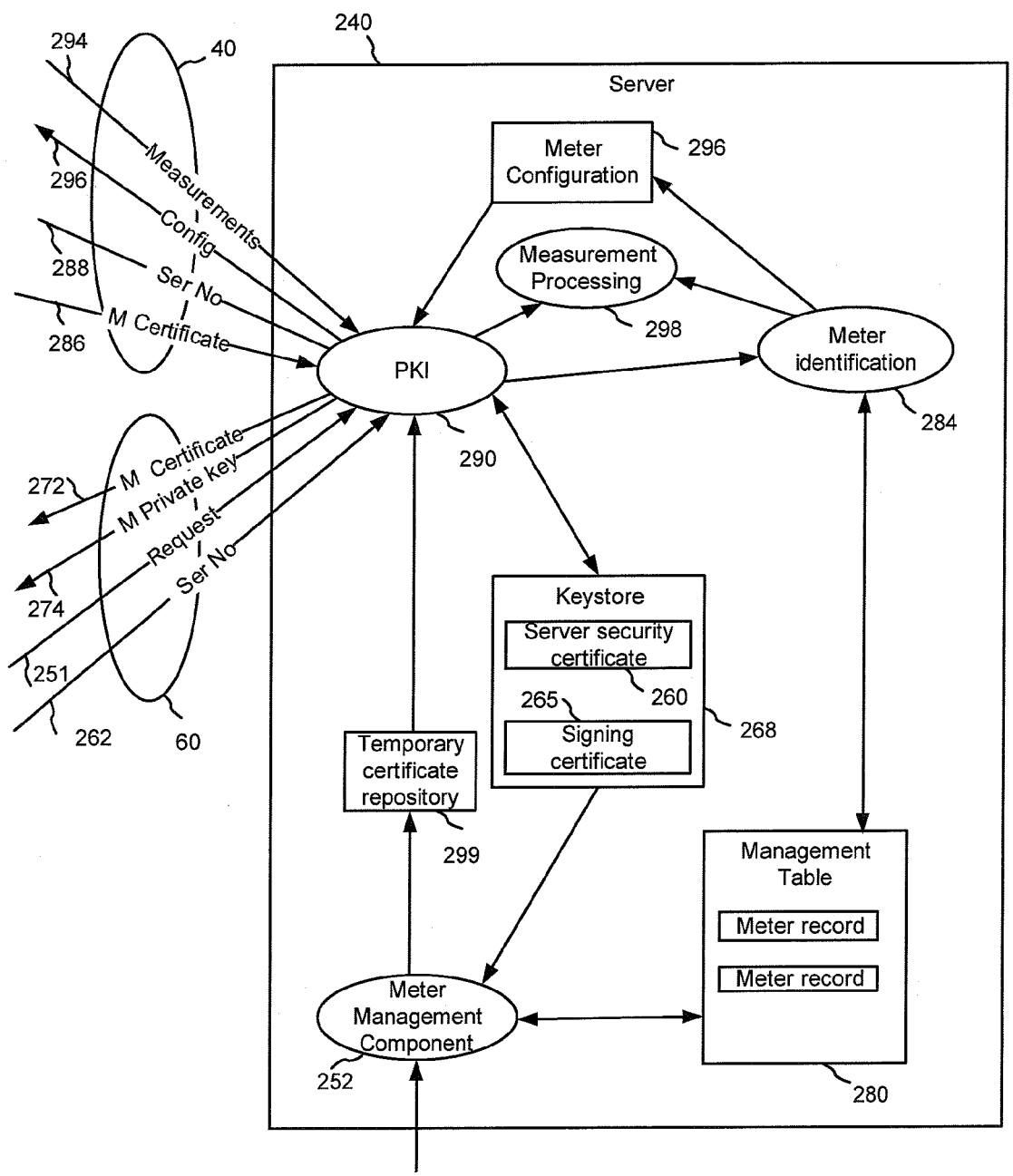
FIG. 4 is a schematic illustration of objects in the memory of the central office.

FIG. 2 is a block diagram of a method of performing measurements by the portable meter 30 and transferring the measurements over a secure channel to the central office 10, including the following steps:

In a synchronization step 100, the portable meter 20 is synchronized with the central office 10 over the trusted interface 60 resulting in the portable meter 20 having a meter copy of a meter certificate, and the central office 10 having a predefined portion of the meter certificate in the meter management table 280 shown in FIG. 4, wherein the predefined portion uniquely identifies the portable meter 20.

After completion of the synchronization step 100, a technician connects the portable meter, now depicted as the meter 30, to the IP network 40 at a customer location.

In a secure connection step 130, a secure connection is established between the meter 30 and the server 10 over the IP network 40 using conventional public-key cryptography for verification of the server and meter security certificates and providing a shared encryption key.

In a meter identification step 140, the meter 30 is identified by comparing the meter certificate received at the server 10 during the secure connection step 130, to the content of the meter management table 280 provided during the synchronization step 100, and determining if the meter management table 280 contains the predefined portion of the received certificate.

The secure connection step 130 and the meter identification step 140 together form a secure channel establishing step 135.

In a measuring step 120, measurements are performed by the portable meter 30 at the customer location. The measuring step 120 may start before, during, or after the secure channel step 135.

A measurement transmission step 150 is performed only if the secure channel is successfully established, that is if the secure PKI connection is provided and the presence of the predefined portion of the received meter certification the server 10 is verified. In the measurement transmission step 150, the measurement data is encrypted with the shared key and transmitted from the meter 30 to the server 10 over the IP network 40. The measurement transmission step 150 may start before completion of the measurement taking step 120.

In a measurement processing step 160, the measurement data received from the portable meter 30 is processed at the server 10.

An Exemplary embodiment will be discussed now in reference to FIGS. 3-9.

During the synchronization step 100, the meter certificate originates at the server 10 and is provided to the meter 20 over the trusted interface 60.

Figure 3:
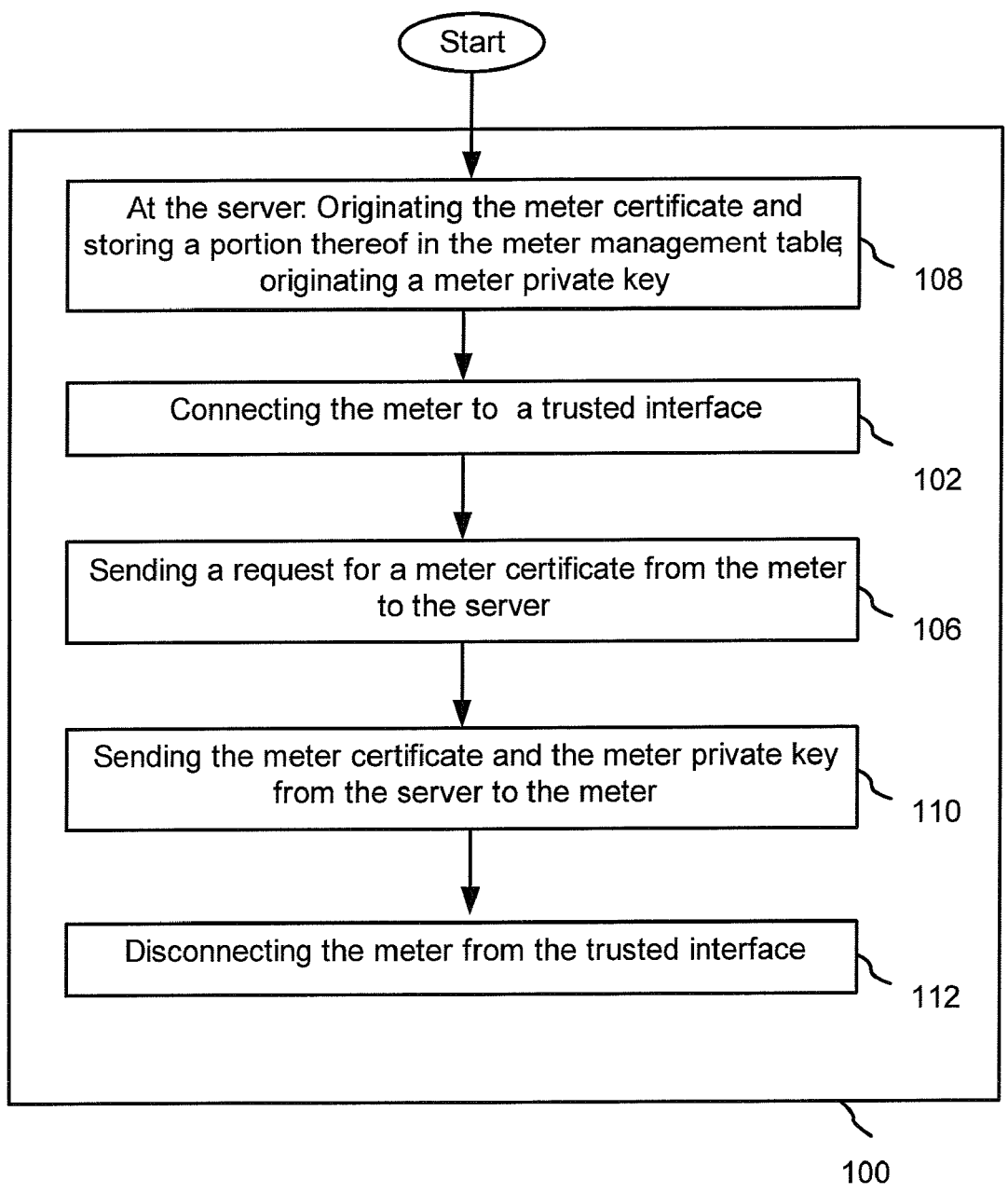
FIG. 3 is a block diagram of the synchronization step 100 from FIG. 2.

In reference to FIGS. 3 and 4, in a meter certificate issue step 108, a meter management component 252 at the server 10 issues the meter certificate 272 and creates a record with the predefined portion of the meter certificate in a meter management table 280. The meter management component 252 is a set of instructions stored within the server memory, generating meter public/private-key pairs, creating meter certificates, and placing the predefined portion of the meter certificate in a meter management table 280, when executed by the server processor.

The meter management component 252 issues the meter certificate 272 signed by the server signing certificate 265 in compliance with conventional standards, such as X.509 standard specified by the Internet Engineering Task Force Request for Comments (RFC) 3280 or OpenPGP standard specified by RFC 4880, both incorporated herein by reference. Additionally to the meter certificate 272, the meter management component 252 provides a meter private key 274, both sent to the meter 20 over the trusted interface 60.

The meter management table 280 is a searchable storage within the server 10, having any structure, such as a flat file, linked list, a database table, etc. For each portable meter known to the server 10, such as the meter 30, the meter management table 280 has a record including at least the predefined portion of the meter certificate 272 uniquely identifying the meter 30 within the plurality of meters.

In the instant embodiment, the predefined portion of the meter certificate 272 is a meter unique identification number (UID) generated by the meter management component 252 or by an administrator.

Figure 6:
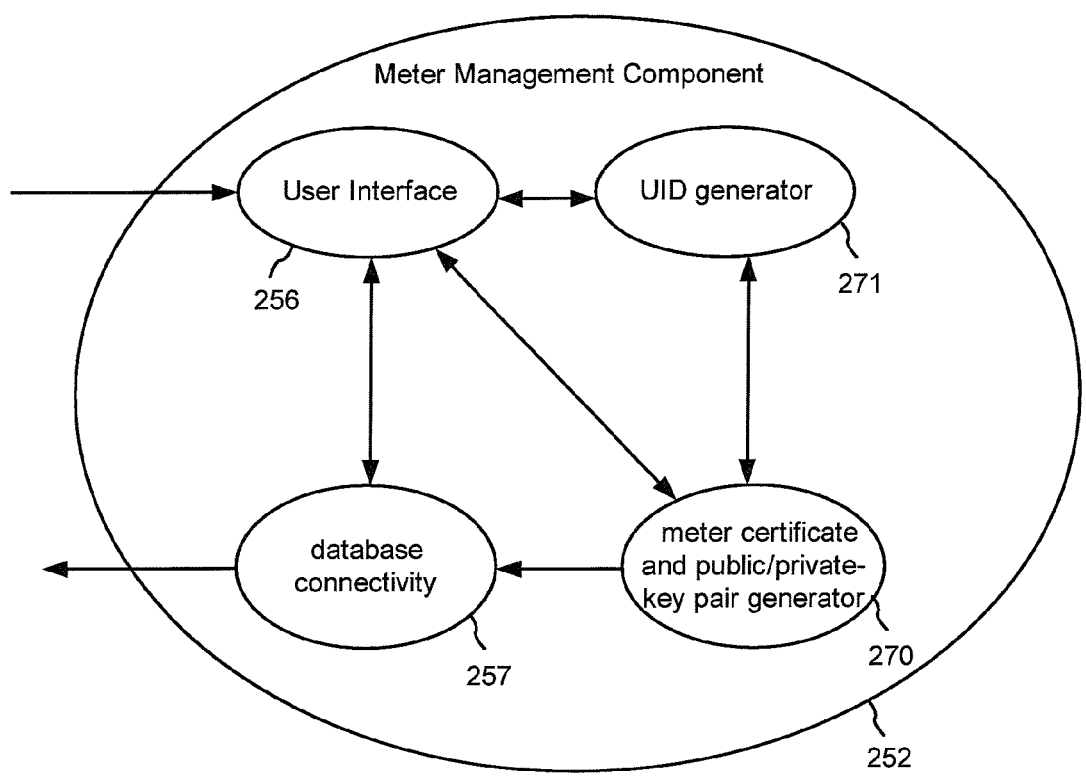
FIG. 6 is a schematic illustration of subcomponents of the meter management component 252 shown in FIG. 4.

In reference to FIG. 6 providing more detail to the meter management component 252 from FIG. 4, the meter management component 252 includes a user interface 256, an optional UID generator 271, a meter certificate and public/private key pair generator 270, and a database connectivity block 257. The user interface 256 can be a GUI, a command line interface, a remote interface, etc.

Figure 7:
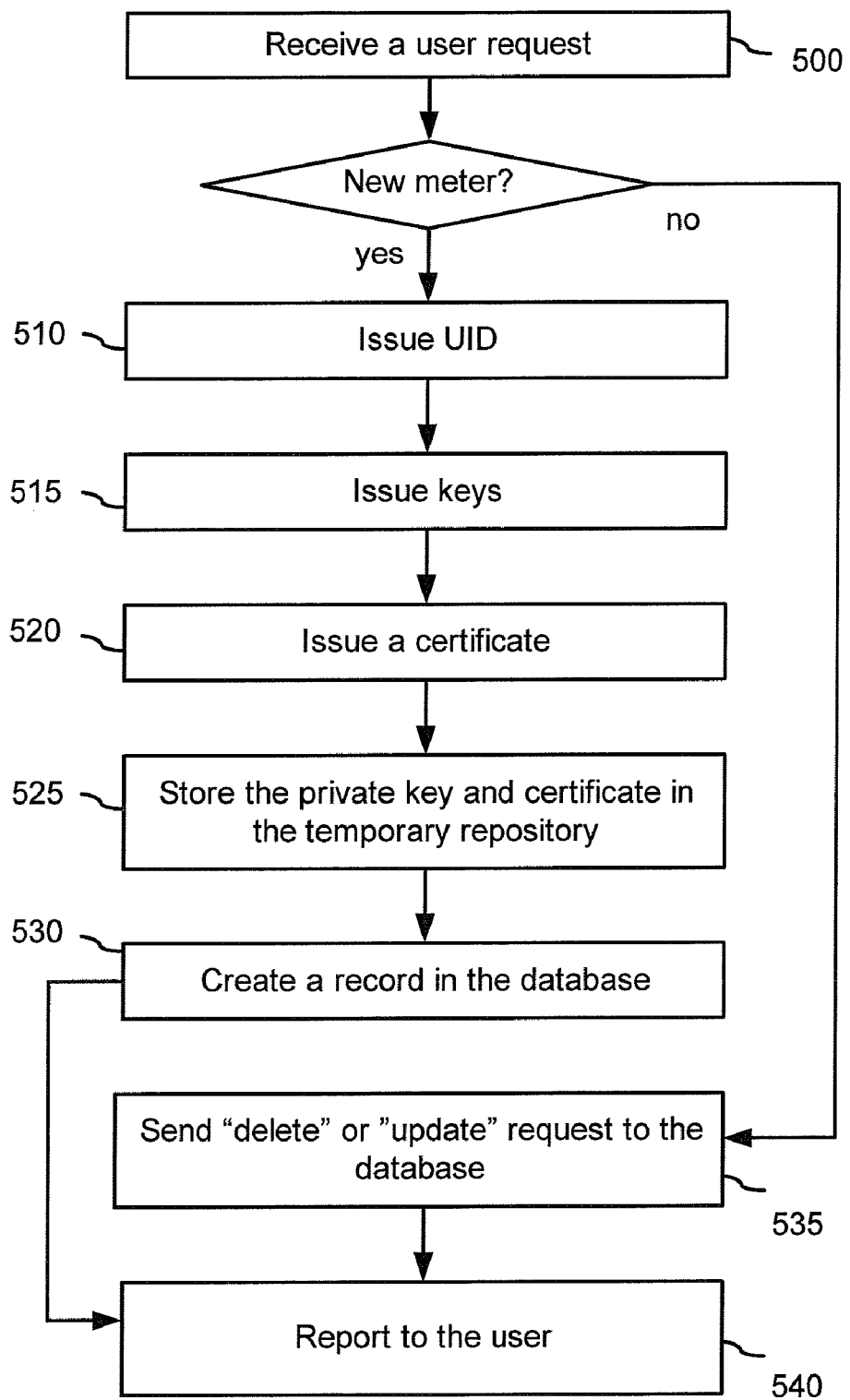
FIG. 7 is a block diagram of the certificate issuing step 108 from FIG. 3.

In reference to FIG. 7, when a need for a new meter certificate 272 arises, an administrator issues a command 500 through the user interface 256.

After that, in a unique ID step 510, the UID is provided either by the administrator or the UID generator 271, by way of example incrementally numbering certificates to track each new certificate request; alternatively, the UID can be associated with an employee ID. The UID generator 271 shown in FIG. 6 is an optional component and can be omitted in the instance when the UID is provided by the administrator, or when the meter certificate serial number is used for meter identification.

Then, in a key issue step 515 from FIG. 7, the meter certificate and public/private key pair generator 270 shown in FIG. 6 creates a public/private key pair for the meter 20.

Figure 5:
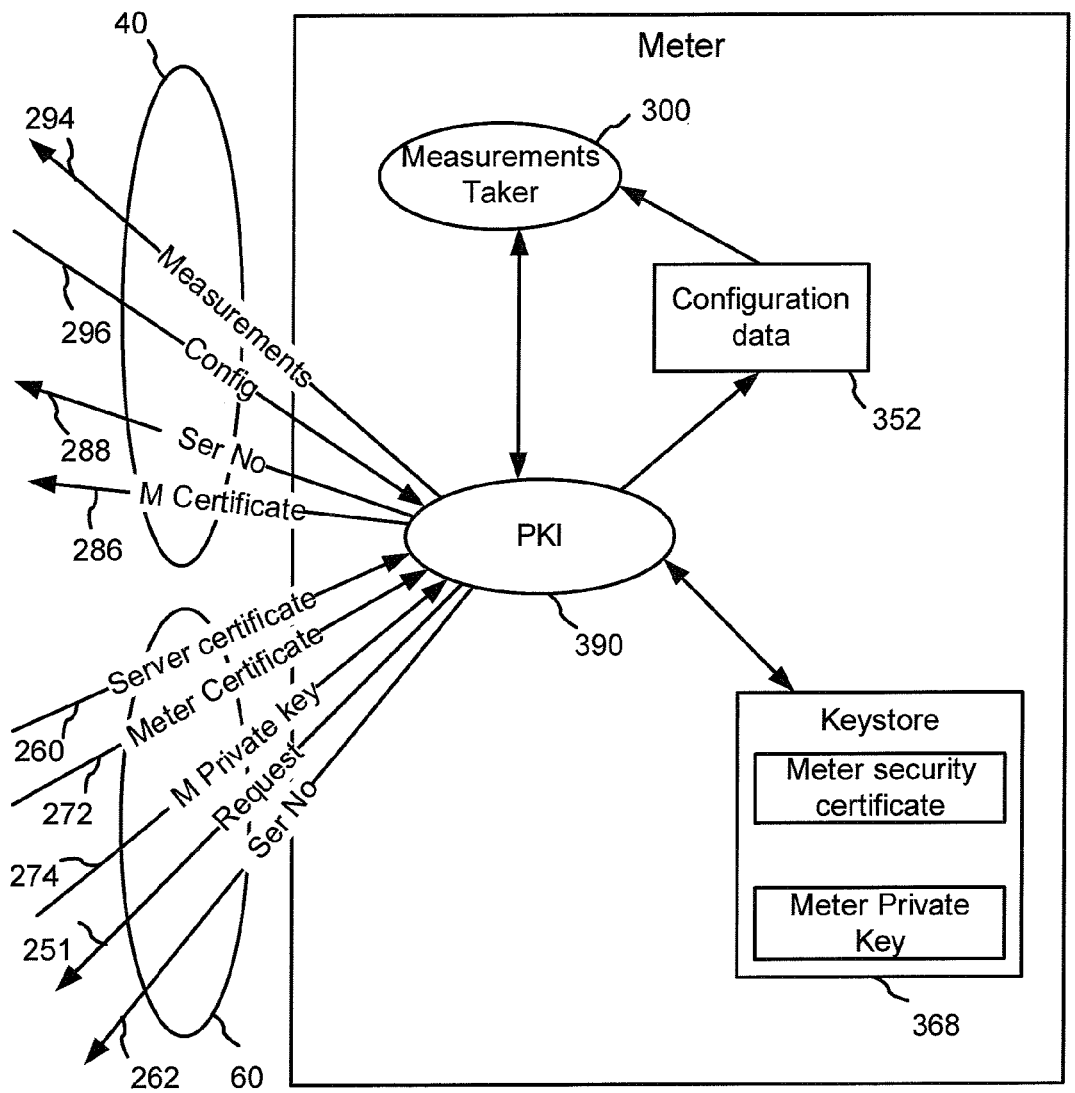
FIG. 5 is a schematic illustration of objects in the memory of the portable meter.

In a certificate issue step 520 from FIG. 7, the meter certificate and public/private key pair generator 270 creates the meter certificate 272 shown in FIGS. 4 and 5. The meter certificate 272 includes the meter UID and the meter public key and is signed by the signing certificate 265.

The meter certificate and public/private key pair generator 270 uses a conventional technique, such as implemented by OpenSSL software developed by OpenSSL Project. The newly created meter certificate and the key pair are stored in a temporary meter certificate repository 299 shown in FIG. 4 or provided directly to the meter 20 via the PKI component 290.

Following the generation of the meter certificate 272, in a record creation step 530 from FIG. 7, a record containing the predefined portion of the meter certificate 272 associated with the meter serial number is provided by the database connectivity component 257 shown in FIG. 6 to the meter management table 280 shown in FIG. 4.

In a report step 540 from FIG. 7, the successful execution of the command 500 is reported to the administrator via the user interface 256 shown in FIG. 6.

In the connection step 102 from FIG. 3, the meter 20 is connected by a technician via the trusted interface 60 to the server 10 having already a server security certificate 260, see FIG. 4, signed by a trusted certification authority (CA) known to the meter 20, and a server signing certificate 265, optionally self-signed, within a keystore 268 implemented, for example, by Tomcat software. Optionally, two certificates, the server security certificate 260 and the server signing certificate 265, are embodied as a single certificate.

The trusted interface 60 shown in FIG. 1 is an interface having very low probability of being tampered with, such as a direct physical connection between the meter 20 and the server 10, or a TCP port not accessible from outside of the firewall 50. By way of example, in a CATV provider company, the server is located in a central office and secure connections can be maintained via local offices in secure communication with the server.

Preferably, the connection established in the connection step 102 is a secure connection, established by a meter PKI component 390 and a server PKI component 290, see FIGS. 5 and 4, wherein the server security certificate 260 received at the meter 20 is validated by comparing the digital signature of the certificate 260 to trusted signatures kept in a meter keystore 368, and a shared encryption key is provided by the meter and sent to the server 10 encrypted with the server public key received by the meter 20 from the server 10.

The meter PKI component 390 shown in FIG. 5 is a set of instructions stored in the meter memory and executed by the meter processor. The server PKI component 290 shown in FIG. 4 is a set of instructions stored in the server memory and executed by the server processor. Both PKI components establish a secure connection between the meter 30 and the server 10 using conventional PKI techniques. By way of example, the server PKI component 290 and the meter PKI component 390 are compliant with the TLS protocol standard specified in the Internet Engineering Task Force (IETF) document RFC 4346 or with the SSL protocol taught in U.S. Pat. No. 5,657,390 to Elgamal et al., both documents incorporated herein by reference, and implemented by conventional software such as available on the market Apache Tomcat.

In the instance the secure connection is established in the connection step 102, the following communications between the server 10 and the meter 20 are encoded with the shared key; related encoding/decoding steps and components would be known to a person skilled in the art and are not discussed here.

During a request step 106 from FIG. 3, the PKI component 390 of the meter 20 sends a request 251 shown in FIGS. 4 and 5 for a meter certificate to the server 10. Preferably, a meter serial number 262 is included within the request 251; alternatively, the meter serial number 262 is provided by the technician; alternatively, no meter identification is provided to the server 10 during the request step 106.

In a certificate sending step 110, in response to the request 251, the meter certificate 272 and the meter private key 274 (see FIGS. 4 and 5) are provided to the meter 20 from the meter management component 252 or from a temporary certificate repository 299 wherein it has been stored by the meter management component 252.

In reference to FIG. 3, the meter certificate issuing step 108 can be performed any time before the certificate sending step 110, for example, in parallel with the connection step 102 and the request step 106.

Each of the communication steps 106 and 110 consists of one or more messages sent using a TCP/IP protocol stack. In the instance if the secure connection has been established during the connection step 102, the communications between the meter 20 and the server 10 over the interface 60 are encrypted with the shared key generated using the server security certificate and the conventional PKI technology.

In a disconnection step 112 shown in FIG. 3, the meter 20 is disconnected from the trusted interface 60. The disconnection step 112 completes the synchronization step 100 from FIG. 2. As a result, the meter 20 has its own certificate and its own private key, and, additionally, the server 10 has the predetermined portion of the meter certificate uniquely identifying the meter 20 within the plurality of meters.

At the customer location, the portable meter, depicted in FIG. 1 as the meter 30, establishes a secure connection with the server 10 over the IP network 40, and, if allowed by the server 10, sends the measurements to the server, in the secure channel step 135 and the measurement sending step 150, respectively.

In the secure connection step 130 from FIG. 2, the secure connection is established by the meter PKI component 390 and the server PKI component 290 shown in FIGS. 5 and 4, respectively.

Figure 8:
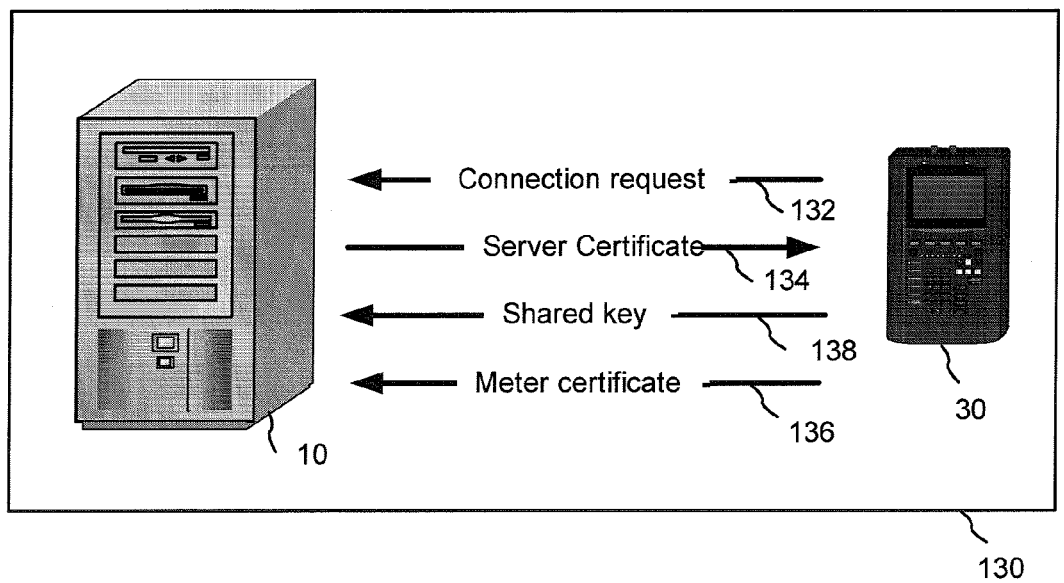
FIG. 8 is a block diagram of the secure connection step 130 from FIG. 2.

In reference to FIG. 8, the secure connection step 130 includes the following steps:

In a connection request 132, the meter PKI component 390 sends a connection request to the server 10.

In a server certificate sending step 134, the server PKI component 290 sends the server certificate to the meter 30, and the meter PKI component 390 verifies the received server security certificate.

In a shared key step 138; the meter PKI component 390 originates a shared key and sends it to the server 10.

In a meter certificate step 136, the meter PKI component 390 sends the meter copy of the meter certificate to the server 10, and the server PKI component 290 verifies the received copy of meter certificate.

The secure connection step 130 includes verification of the server security certificate at the meter and verification of the meter certificate at the server, both based on the expiration date and the digital signature of the certificate authority which has issued the certificate.

Preferably, the secure connection step 130 is governed by the aforementioned TLS or SSL protocols.

After establishing the secure connection in the secure connection step 130, the following communications between the server 10 and the meter 30 are encoded with the shared key; related encoding/decoding steps and components would be known to a person skilled in the art and are not discussed here.

Figure 9:
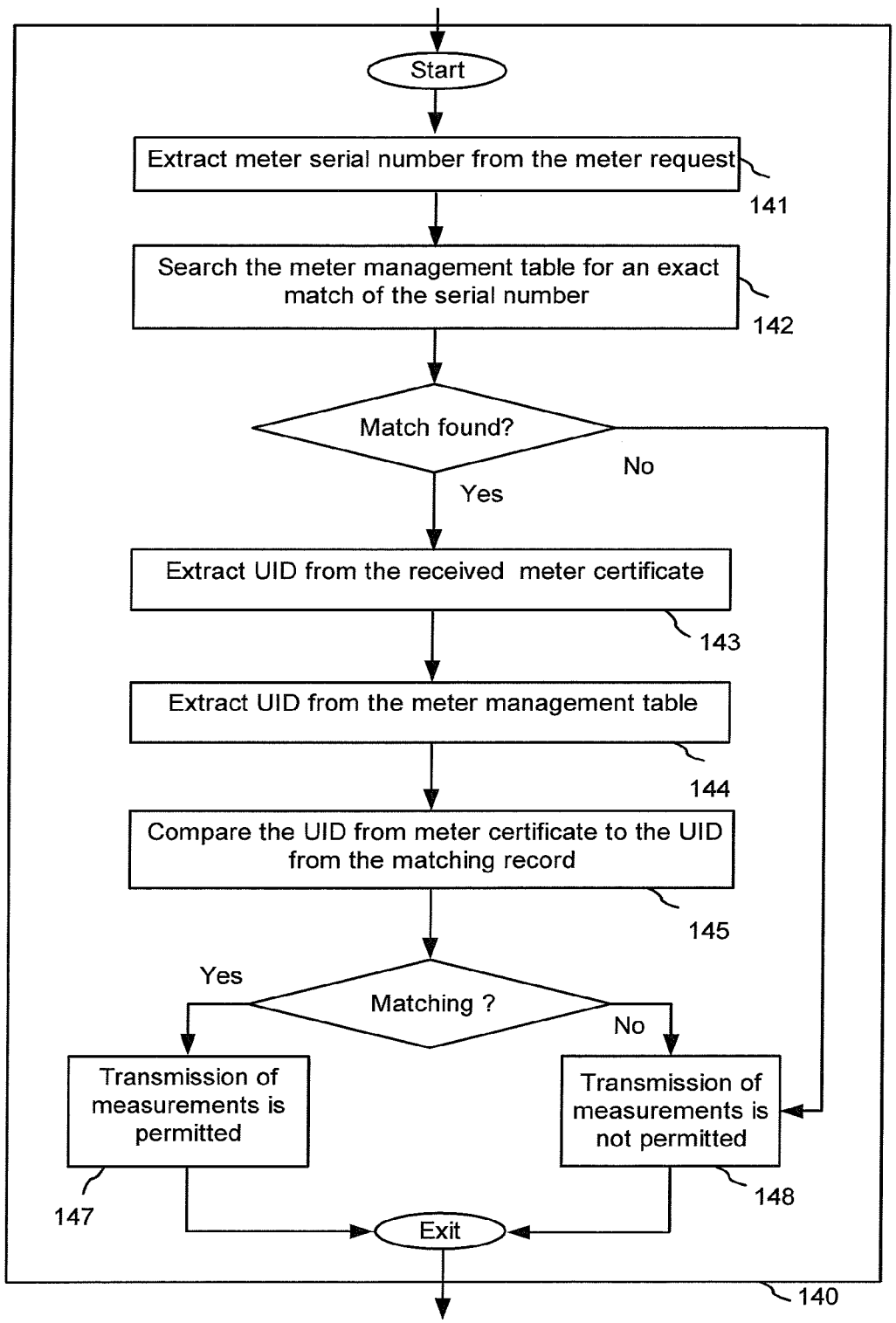
FIG. 9 is a block diagram of the meter identification step 140 from FIG. 2.

In the meter identification step 140 from FIG. 2, a meter identification component 284 shown in FIG. 4 performs meter identification and additional verification of the of the received meter certificate. FIG. 9 depicts the meter identification step 140 in more detail.

In a serial number extraction step 141, the meter identification component 284 extracts a meter serial number 288 from the meter request.

In a search step 142, the meter identification component 284 searches the meter management table 280 for a matching record containing an exact match for the meter serial number 288.

In a permission refusal step 148, if no match is found during the search step 142, the meter 30 is denied access to the server 10 for receiving configuration data 296 or reporting the measurement data obtained in the measuring step 120.

If the match is found in the search step 142, the meter UID is extracted from the received meter certificate 286 in a certificate extraction step 143, and from the matching record in a record extraction step 144; then two copies of the UID are compared in a UID comparison step 145.

If the comparison 145 fails, in the permission refusal step 148 the meter 30 is refused access to the server 10. If the comparison 145 is successful, in a permission grant step 147 the secure channel is established and the meter 30 is allowed to access the server 10.

In the measurement step 120, measurements are performed by measuring means represented in FIG. 5 by the measurement taker 300 implementing any conventional technique, for example, described in U.S. Pat. No. 6,880,115 issued Apr. 12, 2005 to Abraham et al. and U.S. Pat. No. 7,010,598 issued Mar. 7, 2006 to. Sitaraman et al., both incorporated herein by reference. After that, the measurement data 294 is sent to the central office 10 by the PKI component 290, wherein the measurement data 294 is processed by a measurement processing component 298.

It is understood, that shown in FIGS. 4 and 5 and discussed herein are only components of the server 10 and the meter 30 pertinent to the instant invention. Conventional components, such as a TCP/IP stack, encoding/decoding software, and measurement taker would be known to a person skilled in the art.

In reference to FIG. 5, meter instructions include a synchronization instruction set and a meter networking instruction, referred to together as the meter PKI component 390.

The meter synchronization instruction set is for synchronizing the portable meter 20 with the central office 10 at another end of the secure channel, resulting in the portable meter 20 having the meter certificate and the central office 10 having the predefined portion of the meter certificate.

The meter networking instruction set is for sending the meter security certificate over the network to the central office 10 at the another end thereby establishing the secure channel between the portable meter 30 and the central office 10 at the another end of the secure channel, and for sending the measurement data though the secure channel;

The meter networking instruction set is also for sending the serial number to the central office 10, receiving the meter security certificate and a meter private key at the meter 20 from the central office 10 at the another end of the secure channel, and for storing the meter security certificate and the meter private key in the meter memory.

According to the instant invention, the central office has secure channel instructions stored in the central office memory and executed by the central office processor(s).

The secure channel instructions are for providing the another end with the secure channel means, including:

the meter management component 252 for providing a meter management table with a meter record containing the predefined portion of the meter security certificate;

the meter identification instruction set 284 for extracting the predefined portion from the received security certificate, and for identifying the matching record in the meter management table, so that at least a portion of the matching record matches to the predefined portion of the received meter security certificate; and permission refusal instructions within the PKI component 290 for permitting the another end to receive data from a sender of the received security certificate only if the matching record is identified, and for closing the secure channel otherwise.

The secure channel instructions together with conventional software and hardware form secure channel means for synchronizing with the portable meter resulting in the portable meter having the meter certificate stored therein and the central office having the predefined portion of the meter certificate stored therein, for comparing the predefined portion of a received security certificate received over the network to the predefined portion of the meter certificate stored at the central office to determine if there is a match, and for closing the secure channel if no match has been determined.

The portable meter together with the secure channel instructions stored in computer readable memory device for installing on the central office computer form a measuring system for performing measurements and reporting measurement data through a secure channel over a network. The computer readable memory device may be a CD, memory at a network server, etc.

Advantageously, the meter management component 252 enables dynamic meter access management by disabling access of a lost meter to the central office 10 as soon the loss is reported, or if the meter is suspected of faulty performance, or for any other reason. In reference to FIGS. 6 and 7, on request 500 from the administrator via the user interface 256, in a database update step 535, the database connectivity component 257 deletes a corresponding meter record from the meter management table 280 (FIG. 4). As a result, the next connection attempt would fail at the search step 142 (FIG. 9), when a meter record would not be found in the table 280. Alternatively, the record is not deleted but marked as "access not permitted" in the database update step 535, and the search step 142 includes checking access permissions for the particular meter. In reference to FIG. 1, the portable meter 30 may no longer establish a connection through the firewall 50, rather it must be connected to the server 10 via the trusted interface 60 for a newly generated certificate issued to the portable meter 20. The portable meter 20 may now be used outside the firewall 50 to make subsequent connections via the internet 40 through the firewall 50.

Optionally, the meter management component 252 shown in FIG. 4 enables dynamic resource and staff management, correlation of billing system data to saved meter results, certification management reporting monitoring of the meters and technicians by logging fulfilled work orders.

Other embodiments of the instant invention may differ from the aforedescribed exemplary embodiment as follows:

In reference to FIG. 5, in one embodiment, after the secure channel is established, the meter PKI component 390 receives the configuration data 296, such as work orders specified in the aforementioned U.S. Pat. No. 7,111,318, provided by the server 10, and stores it in the meter configuration data repository 352 for use by the measurement taker 300. The measurement step 120, see FIG. 2, starts after establishing the secure channel in the secure channel step 135 and is performed in accordance with the test configuration data 296.

In reference to FIG. 4, in one embodiment, the predefined portion of the meter certificate 286 which goes into the meter management table 280 is the serial number of the meter certificate 286, and the meter UID is optional.

In one embodiment, the predefined portion of the meter certificate 286 which goes into the meter management table 280 is the serial number of the meter certificate 286, and the meter UID is optional.

In one embodiment, the creation of the meter certificate 286 by the meter management component 252, steps 510-530 in FIG. 7, are performed automatically in response to the meter request 251 without user request 500. In reference to FIG. 3, the certificate origination step 108 is performed after the request step 106 and before the response step 110.

In one embodiment, the meter certificate is issued not by the server 10, but issued by the meter 20 itself or provided to the meter 20 by a third party certificate authority (CA). In the synchronization step 100, the meter certificate, or the predetermined portion thereof is provided by the meter 20 over a secure interface 60 to the server 10, wherein the meter certificate, or its portion is stored in the meter management table 280.

In one embodiment, the predefined portion of the meter certificate is the whole certificate stored in a conventional truststore, implemented, for example, by Tomcat software, and each record in the meter management table 280 contains a meter certificate serial number or a memory reference to the certificate, and the meter UID and/or meter serial number.

Of course, numerous other embodiments may be envisioned without departing from the spirit and scope of the invention.

We claim:

1. A method of performing measurements with a portable meter and reporting measurement data from the portable meter to a central office having a server security certificate and a meter management table stored in the central office, comprising the steps of:
    (a) synchronizing the portable meter at a first location with the central office over a trusted interface resulting in the portable meter having a meter copy of a meter certificate and the central office having a predefined portion of the meter certificate in the meter management table, wherein the predefined portion uniquely identifies the portable meter;
    (b) performing the measurements with the portable meter and generating the measurement data;
    (c) establishing a secure channel between the portable meter connected to an IP network at a second location and the central office, including
        transmitting the server security certificate from the central office to the portable meter;
        transmitting the meter copy of the meter certificate from the portable meter to the central office, thereby providing the central office with a received copy of the meter certificate;
        verifying the received copy of the meter certificate at the central office;
        determining if the meter management table contains the predefined portion of the received copy of the meter certificate;
        transmitting the measurement data to the central office from the portable meter over the IP network though the secure channel if the received certificate is successfully verified and if the meter management table contains the predefined portion of the received copy of the meter certificate;
        wherein the second location is different from the first location;
    (d) processing the measurement data received from the portable meter at the central office.

2. A method defined in claim 1, wherein the portable meter has a meter serial number stored therein; and wherein step (a) includes providing the central office with a first copy of the meter serial number, and storing the first copy in the meter management table together with the predefined portion of the meter certificate; and
    step (c) includes transmitting a second copy of the meter serial number with the portable meter to the central office; determining the first copy of the meter serial number based on the predefined portion of the meter certificate; and comparing the first and second copies.

3. A method defined in claim 1, wherein in step (a) the central office provides the meter certificate to the portable meter.

4. A method defined in claim 3, wherein the predefined portion of the meter certificate includes a meter unique ID assigned by the central office to the portable meter.

5. A method defined in claim 1, wherein in step (a) the meter certificate is signed by a certification authority.

6. A method defined in claim 1, wherein the portable meter is a CATV meter for measuring signals transmitted over a CATV link.

7. A method defined in claim 1, wherein step (c) includes using a SSL protocol or a TLS protocol.

8. A method defined in claim 1, wherein step (a) includes establishing a secure connection using the server security certificate.

9. A method defined in claim 1, comprising a step of removing the predefined portion of the meter certificate from the meter management table.

10. A method defined in claim 1, wherein the first location is a trusted location and the second location is a customer location.

11. A portable meter for performing measurements at a first location and reporting measurement data through a secure channel over a network, comprising:
   measuring means for performing the measurements at the first location and generating the measurement data,
   a meter memory for storing a meter security certificate and having meter instructions stored therein including:
      a synchronization instruction set
         for synchronizing the portable meter at a second location with another end of the secure channel, resulting in the portable meter having the meter certificate and the another end having a predefined portion of the meter certificate, wherein the predefined portion uniquely identifies the portable meter; and
      a meter networking instruction set
         for sending the meter security certificate over the network to the another end, thereby establishing the secure channel between the portable meter at the first location and the another end, and
         for sending the measurement data though the secure channel;
   wherein the another end has secure channel means
      for synchronizing with the portable meter resulting in the portable meter having the meter certificate stored therein and the another end having the predefined portion of the meter certificate stored therein,
      for comparing the predefined portion of a received security certificate received over the network to the predefined portion of the meter certificate stored at the another end to determine if there is a match, and
      for closing the secure channel if no match has been determined.

12. A portable meter defined in claim 11, wherein the synchronization instruction set is for receiving the meter security certificate and a meter private key from the another end and for storing the meter security certificate and the meter private key in the meter memory.

13. A portable meter defined in claim 12, having a meter serial number stored in the meter memory, wherein
   the meter synchronization instruction set is for sending the serial number to the another end and receiving the meter security certificate in response to sending the serial number;
   the meter networking instruction set is for transmitting the serial number to the another end together with the meter security certificate, over the network.

14. A measuring system comprising the portable meter defined in claim 11 and a computer readable memory device having secure channel instructions stored therein for providing the another end with the secure channel means, including:
   a meter management component for providing a meter management table with a meter record containing the predefined portion of the meter security certificate;
   a meter identification instruction set
      for extracting the predefined portion from a received security certificate, and
      for identifying a matching record in the meter management table, so that at least a portion of the matching record matches the predefined portion of the received meter security certificate; and
   permission refusal instructions
      for permitting the another end to receive data from a sender of the received security certificate only if the matching record is identified, and
      for closing the secure channel otherwise.

15. A measuring system defined in claim 14,
   further comprising a meter serial number stored in the meter memory,
   wherein the meter networking instruction set is for providing the central office with a first copy of the meter serial number,
   wherein the meter management component is for providing the first copy of the meter serial number to the meter record;
   and wherein the meter identification instruction set is for identifying the matching record so that the first copy of the meter serial number matches to a second copy of the serial number received from the sender of the received security certificate.

16. A measuring system defined in claim 14, wherein
   the meter management component is for issuing the meter security certificate;
   the secure channel instructions include instructions for providing the meter security certificate and a meter private key to the portable meter;
   and wherein
   the meter instructions include instructions for receiving the meter security certificate from the another end.

17. A measuring system defined in claim 14, wherein the portable meter is one of a plurality of meters known to the another end, and each meter is associated with a record in the meter management table.

18. A measuring system defined in claim 14, wherein the meter management component is for deleting a record from the meter management table.

19. A measuring system defined in claim 14, wherein the portable meter is a CATV meter.

* * * * *